United States Patent [19]

Burdorf

[11] 4,071,177

[45] Jan. 31, 1978

[54] SELF-CENTERING AIR GUIDE FOR TAPE TRANSPORTS

[75] Inventor: Donald L. Burdorf, Newport Beach, Calif.

[73] Assignee: BASF Aktiengesellschaft, Ludwigshafen (Rhine), Germany

[21] Appl. No.: 594,855

[22] Filed: July 10, 1975

Related U.S. Application Data

[63] Continuation-in-part of Ser. No. 521,882, Nov. 7, 1974, Pat. No. 3,979,037.

[51] Int. Cl.² .............................................. B65H 17/32
[52] U.S. Cl. .......................................... 226/7; 226/97; 226/196
[58] Field of Search .................. 226/7, 97, 196, 197, 226/198, 199, 179, 95; 360/162; 242/76

[56] References Cited

U.S. PATENT DOCUMENTS

| | | | |
|---|---|---|---|
| 2,979,829 | 4/1961 | Uhleen | 226/179 |
| 3,032,246 | 5/1962 | Fritze | 226/97 |
| 3,087,664 | 4/1963 | Streeter | 226/97 |

Primary Examiner—Allen N. Knowles
Attorney, Agent, or Firm—Keil, Thompson & Shurtleff

[57] ABSTRACT

An apparatus for guiding a span of high speed magnetic recording tape past a recording/transducing head. Pressurized air is utilized to lift the tape off of the guide thereby eliminating sliding friction between the apparatus and the tape. In addition, a pair of beveled flanges are provided on opposite sides of the path followed by the tape as it is transported, which are spaced apart at their base a distance less than the minimum width of the tape. In operation, an air film of substantially constant pressure is generated along the air chamber formed by the tape, guide, beveled flanges and tangent points where the tape enters and exits from the guide sufficient to lift the tape off of the guide to a point where its width substantially equals the horizontal distance between the beveled flanges, thereby maintaining the tape in a centered relationship with respect to the center line of the guide and impeding the airflow about the lateral edges of the tape. In this manner, the magnetic tape will remain in alignment with the recording/transducing head irrespective of manufacturing variations in its width.

11 Claims, 3 Drawing Figures

4,071,177

SELF-CENTERING AIR GUIDE FOR TAPE TRANSPORTS

INTRODUCTION

This is a Continuation-in-Part of Ser. No. 521,882, filed Nov. 7, 1974, now U.S. Pat. No. 3,979,037. The present invention relates generally to an apparatus for guiding a span of recording tape past a magnetic recording head and, more particularly, to a self-centering air guide apparatus.

BACKGROUND OF THE INVENTION

Although many variations of high speed recording tape guides, including air guides, are known and used in the magnetic recording industry, it has been found that a number of serious problems relating to friction and tape alignment have been associated with their use. These problems become particularly acute when processing video signals due to the high tape speeds involved and, consequently, the multiplicity of tracks of extremely narrow width that must be utilized in order to provide record and/or playback capability for programs of reasonable duration on a tape of manageable length.

For example, in a video system which operates at a tape speed of 120 inches per second, 36,000 feet of tape pass the transducing head each hour. Due to physical and cost limitations in reel size, the data is generally recorded on a multiplicity of parallel tracks, and the shorter length of tape which results is passed repeatedly past the transducer head, each time reading information from a different track. In this manner an 1800 foot reel of tape having 30 tracks can be used to record or playback a 90 minute program utilizing the above-described system.

However, the requirement that the tape pass through the transport 30 times per program has resulted in serious wear considerations which it has been found may be greatly overcome through utilization of air guide type of tape transport. In addition, due to the requirement that 30 different informational tracks be placed in parallel relation on a tape of reasonable and economical width for consumer use, typically ¼ inch, a related problem concerning alignment of the extremely narrow tracks on the tape with a corresponding transducer head has arisen. This problem is compounded by the fact that commercially available magnetic tape is manufactured to width tolerances which approach the individual track width required (typically about 6 mil with 2 mil spacing between tracks) for utilization of 30 tracks on a ¼ inch tape format.

Conventional tape guides have attempted to control tape track to head alignment by providing vertical guide flanges on opposite sides of the path followed by the tape as it is transported past the head. However, it has been found that particularly in high speed applications, a minimum clearance must be provided between the tape and guide flanges to reduce friction. Furthermore, any non-straightness of the tape over the length of the guide requires additional clearance between the tape and guide flanges. These clearance requirements inhibit accurate tape guidance as any lateral shift of the tape within the guide flange area will result in guidance error, since the playback head contact pattern will not precisely duplicate the record head pattern recorded as a track on the tape. It has also been found that the rubbing of the tape along conventional guide flanges produces undesirable longitudinal vibrations in the tape, commonly referred to as "scrape flutter", which degrade the overall performance of the video system.

BRIEF DESCRIPTION OF THE INVENTION

The present invention eliminates the above described friction and alignment problems found with conventional tape transports by providing an improved air guide apparatus having beveled flanges over which the tape passes as it is transported. The beveled flanges are spaced apart at their base a distance less than the minimum width tolerance of the recording tape to be used.

In operation, an air film of substantially constant pressure is generated along the air chamber formed by the tape, beveled flanges and tangent points where the tape enters and exits from the guide sufficient to lift the tape to a point where its width substantially equals the horizontal distance between the beveled flanges, thereby maintaining the tape in a centered relationship with respect to the center line of the guide and impeding the airflow about the lateral edges of the tape. Manufacturing variations in tape width do not affect this centered relationship or the impeding of the airflow about the edges of the tape, since the tape will self-adjust up or down between the beveled flanges in response to any width variations. Hence, lateral movement of the tape is eliminated within the guide, thereby achieving precision alignment of the playback head and the record head pattern recorded as an individual track on the tape, and air pressure and flow requirements of the system may be greatly reduced as a result of the airflow being impeded about the lateral edges of the tape. In addition, "scrape flutter" is greatly reduced because the tape edges tend to be pushed away from the surface of the beveled flanges by the air film generated.

DESCRIPTION OF THE PREFERRED EMBODIMENT

Figure 1:
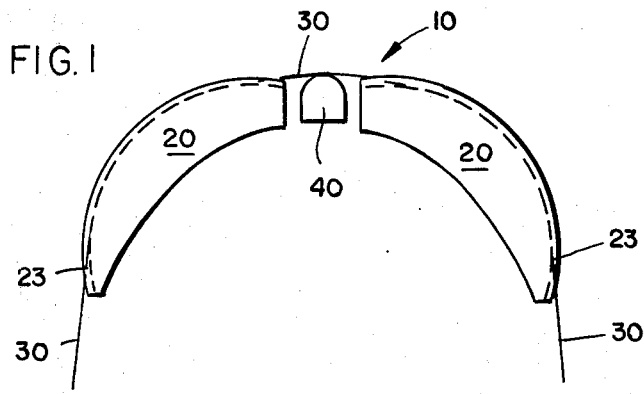
FIG. 1 is a top plan view of a self-centering air guide apparatus constructed in accordance with an embodiment of the present invention.

FIG. 1 illustrates an embodiment of a self-centering air guide 10 constructed in accordance with the present invention. A pair of corresponding guides 20 define the path of a span of recording tape 30 as it is transported past transducer head 40. The positioning of guides 20 is symmetrical with respect to head 40, which is mounted therebetween, in order to permit bidirectional transport of the tape. In the preferred embodiment the longitudinal dimension of guides 20 is formed in the shape of a segment of a cylinder having a 1-inch radius and the guides are mounted in the apparatus with a ½-inch gap between their inner edges wherein head 40 is mounted.

Figure 2:
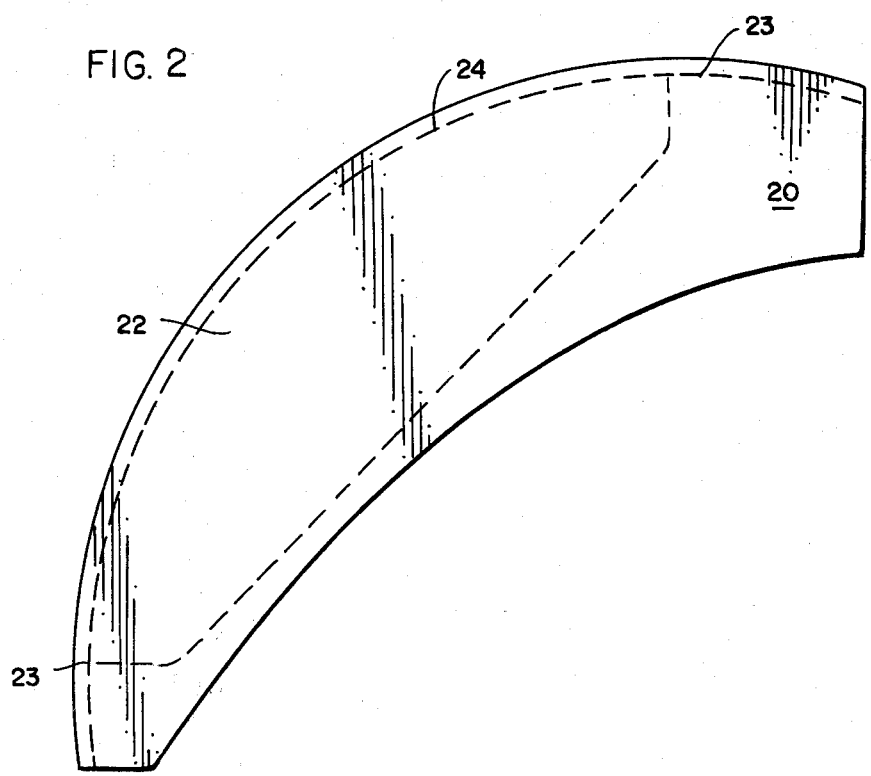
FIG. 2 is an enlarged top plan view of a portion of the apparatus shown in FIG. 1.
Figure 3:
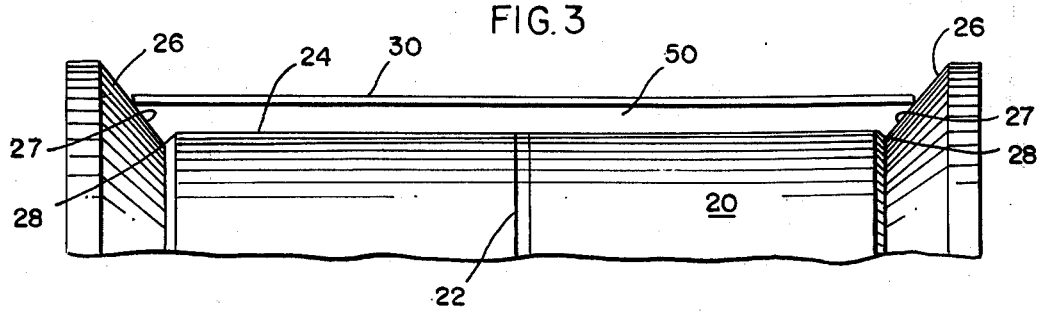
FIG. 3 is a partial, enlarged side view of the apparatus shown in FIG. 2.

Referring now to FIGS. 2 and 3, an air inlet slot 22 if formed longitudinally in support surface 24 of guides 20 in order to provide air under pressure along a portion of said surface. Although the air providing means is shown as a slot 22 in the preferred embodiment, it is noted that it may also comprise a multiplicity of slots, holes, or porous material. Slot 22 is located between tangent points 23 where tape 30 forms an air seal with support surface 24 before lifting from the periphery thereof on its way to or from the takeup and supply reels (not shown) or over head 40.

A pair of beveled flanges 26 are provided on opposite sides of the path followed by the tape as it is transported over support surface 24. These flanges are spaced apart at their base 27 a distance less than the minimum width of the tape to be utilized in the system. It has been found that optimal results have been achieved when beveled flanges 26 form an angle of about 135° degrees in relation to support surface 24, although satisfactory results have been achieved over a wide range of obtuse angles.

FIG. 3 also illustrates a particular embodiment of the present invention wherein the base of beveled flanges 26 is formed at a point 28 below the surface of support surface 24 and along its longitudinal edges. This configuration allows for a sharp longitudinal edge to be formed between surface 24 and flanges 26 without the necessity of utilizing highly accurate cutting tools during the manufacturing operation. However, satisfactory results have also been obtained by forming these flange bases at support surface 24 with a transitional radius of about 0.003 inch therebetween.

In operation, a compressed air supply (not shown) is connected to inlet slot 22 in guides 20 and sufficient pressure is generated between tape 30, support surface 24 and beveled flanges 26 to lift the tape off of the support surface to a point where its width substantially equals the horizontal distance between the beveled flanges. In practice it has been found that pressure in the range of from about 14 to 20 inches of water is sufficient to lift the tape, under 2 ounces of tension, to the above-described level. This operation is best illustrated by FIG. 3 where tape 30 is shown supported on a film of pressurized air 50 between beveled flanges 26. When supported in this manner, tape 30 will rise or drop along the surface of flanges 26 as variations in tape width are experienced during the transport operation, thereby maintaining the longitudinal centerline of the tape in a precise centered relationship with respect to the longitudinal centerline of support surface 24 and guide 20. Hence, lateral movement of the tape is eliminated irrespective of manufacturing variations in tape width and precision alignment of the playback head with the individual track recorded on the tape is maintained at all times.

In addition, since sufficient air pressure may be provided so as to allow for a pressure drop between the edges of the tape and the adjacent surface of the beveled flanges so as to insure that the tape will seek the proper level between the flanges, "scrape flutter" is greatly reduced because the tape edges tend to be pushed away from the flange surfaces, thereby minimizing physical contact and resulting friction therebetween.

While several particular embodiments of the present invention have been shown and described, it should be understood that various obvious changes and modifications thereto may be made, and it is therefore intended in the following claims to include all such modifications and changes as may fall within the spirit and scope of this invention.

What is claimed is:

1. A method of guiding a span of recording tape in a self-centering relation to the center line of a support surface having a pair of beveled flanges formed along its longitudinal sides which are spaced apart at their base a distance less than the minimum width of the recording tape, said method comprising:

transporting the recording tape along the support surface;

tensioning the recording tape so as to maintain it in close proximity to said support surface; and providing air under pressure along a portion of said support surface so that a film of pressurized air is generated between said tape, support surface and beveled flanges sufficient to lift said tape off said support surface to a point where its width substantially equals the horizontal distance between said beveled flanges, thereby maintaining said tape in a centered relationship with respect to the centerline of said support surface.

2. The apparatus of claim 1 wherein said beveled flanges form an obtuse angle in relation to said support surface.

3. The apparatus of claim 1 wherein said beveled flanges form an angle of about 135 degrees in relation to said support surface.

4. The apparatus of claim 1 wherein the longitudinal dimension of said support surface is in the shape of a segment of a cylinder.

5. The apparatus of claim 1 wherein the base of said beveled flanges is formed at a point below the surface of said support surface along its longitudinal edges.

6. The apparatus of claim 1 wherein the air providing means is a slot formed longitudinally in a portion of said support surface.

7. The apparatus of claim 1 wherein the air providing means is located along a portion of said support surface between the tangent points of said recording tape with respect to said support surface.

8. A self-centering air guide apparatus adapted to guide a span of recording tape as it is transported, said apparatus comprising:

a curved support surface;

a means for centering the recording tape and impeding the airflow about the lateral edges of said tape as it is transported over said support surface comprising a pair of beveled flanges spaced apart at their base a distance less than the minimum width of said recording tape and located on opposite sides of the path followed by said tape over said support surface between the tangent points where said tape enters and exits from the guide in close proximity to said support surface; and a means for providing air under pressure along a portion of said support surface whereby an air film of substantially constant pressure may be generated along the air chamber formed by said tape, support surface, beveled flanges and tangent points to support said tape.

9. The apparatus of claim 8 further comprising a compressed air supply connected to said air providing means whereby as said recording tape travels over said support said film of pressurized air will lift said tape off said support surface to a point where its width substantialy equals the horizontal distance between said beveled flanges, thereby maintaining said tape in a centered relationship with respect to the center-line of said support surface.

10. A self-centering air guide apparatus adapted to guide a span of recording tape as it is transported, said apparatus comprising:

a curved support surface;

a means for centering the recording tape and impeding the airflow about the lateral edges of said tape as it is transported over said support surface comprising a pair of beveled flanges spaced apart at their base a distance less than the minimum width of said recording tape and located on opposite sides of the path followed by said tape over said support surface between the tangent points where said tape enters and exits from the guide in close proximity to said support surface;

a means for providing air under pressure along a portion of said support surface whereby an air film of substantially constant pressure may be generated along the air chamber formed by said tape, support surface, beveled flanges and tangent points to support said tape; and a compressed air supply connected to said air providing means whereby as said recording tape travels over said support surface said film of pressurized air will lift said tape off said support surface to a point where its width substantially equals the horizontal distance between said beveled flanges, thereby maintaining said tape in a centered relationship with respect to the center line of said support surface.

11. A method of guiding a span of recording tape in a self-centering relation to the center line of a curved support surface having a pair of beveled flanges formed along its longitudinal sides which are spaced apart at their base a distance less than the minimum width of the recording tape and a pair of tangent points where said tape enters and exits from the guide in close proximity to said support surface, said method comprising:

transporting the recording tape along the support surface;

tensioning the recording tape so as to maintain it in close proximity to said support surface; and providing air under pressure along a portion of said support surface so that an air film of substantially constant pressure is generated along the air chamber formed by said tape, support surface, beveled flanges and tangent points sufficient to lift said tape off said support surface to a point where its width substantially equals the horizontal distance between said beveled flanges, thereby maintaining said tape in a centered relationship with respect to the centerline of said support surface.

* * * * *